(12) United States Patent
Silverman et al.

(10) Patent No.: US 11,516,808 B2
(45) Date of Patent: Nov. 29, 2022

(54) CHANNEL COORDINATION FOR OPTIMIZATION OF IIOT DEVICE LOCATION AND DATA SERVICES IN WIFI NETWORK

(71) Applicant: Cisco Technology, Inc., San Jose, CA (US)

(72) Inventors: Matthew Aaron Silverman, Shaker Heights, OH (US); Ardalan Alizadeh, Milpitas, CA (US); Pooya Monajemi, San Jose, CA (US); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 133 days.

(21) Appl. No.: 17/154,131

(22) Filed: Jan. 21, 2021

(65) Prior Publication Data
US 2022/0232551 A1 Jul. 21, 2022

(51) Int. Cl.
*H04W 72/04* (2009.01)
*H04W 84/12* (2009.01)

(52) U.S. Cl.
CPC .......... *H04W 72/048* (2013.01); *H04W 84/12* (2013.01)

(58) Field of Classification Search
None
See application file for complete search history.

(56) References Cited

U.S. PATENT DOCUMENTS

| 10,548,109 B2 | 1/2020 | Webb |
| 2014/0098748 A1 | 4/2014 | Chan et al. |
| 2015/0237631 A1 | 8/2015 | Noh et al. |
| 2016/0066349 A1 | 3/2016 | Seok |
| 2017/0171868 A1* | 6/2017 | Reis .............. H04W 72/082 |
| 2017/0272317 A1 | 9/2017 | Singla et al. |

(Continued)

OTHER PUBLICATIONS

Au, "Specification Framework for TGbe", Jun. 17, 2020, [online], [retrieved on Dec. 22, 2020]. Retrieved from the Internet: URL: <https://mentor.ieee.org/802.11/dcn/19/11-19-1262-10-00be-specification-framework-for-tgbe.docx>, pp. 1-31.

(Continued)

*Primary Examiner* — Hong S Cho
(74) *Attorney, Agent, or Firm* — Behmke Innovation Group; James M. Behmke; Jonathon P. Western

(57) ABSTRACT

In one embodiment, a method comprises first causing, by a controller device, wireless access points (APs) to allocate first non-interfering wireless channels for a prescribed reliable data service for wireless client devices in a WLAN; second causing the wireless APs to allocate a second shared channel having a bandwidth that is at least twice the corresponding bandwidth of any of the first non-interfering wireless channels; allocating for each wireless client device a corresponding location service interval on the second shared channel for transmission of at least a corresponding identifiable wireless data unit for locating the corresponding wireless client device between two or more of the wireless APs; and determining a location of at least one of the wireless client devices based on reception of at least the corresponding wireless data unit between the one wireless client device and the two or more wireless APs during the corresponding location service interval.

20 Claims, 8 Drawing Sheets

(56) References Cited

U.S. PATENT DOCUMENTS

2019/0341811 A1* 11/2019 Elliott .................. H04L 67/12
2020/0067577 A1 2/2020 Lou et al.

OTHER PUBLICATIONS

Amizur et al., "An unified 802.11az Protocol", Nov. 8, 2016, [online], [retrieved on Jan. 6, 2021]. Retrieved from the Internet: URL: <https://www.google.com/url?sa=t&rct=j&q=&esrc=s&source=web&cd=&ved=2ahUKEwisnsfh0ljuAhVjElkFHTq9CEIQFjAHegQICxAC&url=https%3A%2F%2Fmentor.ieee.org%2F802.11%2Fdcn%2F16%2F11-16-1494-01-00az-an-unified-802-1-&usg=AOvVaw01N8NwBRRQvgJA5KH3zs9U>, pp. 1-20.

Zhou et al., "A Channel Assignment Scheme for Location Service in Multi-channel Mobile Ad Hoc Networks", [online], [retrieved on Dec. 22, 2020]. Retrieved from the Internet: URL: <https://ieeexplore.ieee.org/document/5677642>, 6 pages.

\* cited by examiner

INTERFERING WIRELESS REGIONS 54

| SOURCE WIRELESS REGION | AFFECTED WIRELESS REGION(S) (BY NEIGHBORING APs) |
|---|---|
| R1 (CH036) | R2, R4, R5 |
| R2 (CH100) | R1, R3, R4, R5, R6 |
| R3 (CH044) | R2, R5, R6 |
| R4 (CH161) | R1, R2, R5 |
| R5 (CH064) | R1, R2, R3, R4, R6 |
| R6 (CH116) | R2, R3, R5 |

FIG. 4A

NON-INTERFERING WIRELESS REGIONS 56

| SOURCE WIRELESS REGION | UNAFFECTED WIRELESS REGION(S) (BY NON-NEIGHBORING APs) |
|---|---|
| R1 | R3, R6 |
| R3 | R1, R4 |
| R4 | R3, R6 |
| R6 | R1, R4 |

FIG. 4B

CHANNEL COORDINATION FOR OPTIMIZATION OF IIOT DEVICE LOCATION AND DATA SERVICES IN WIFI NETWORK

TECHNICAL FIELD

The present disclosure generally relates to channel coordination for optimization of Industrial Internet of Things (IIoT) device location and data services in a WiFi network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Location services are becoming more critical for wireless network devices, including mobile Industrial Internet of Things (IIoT) devices that rely on wireless network communications for executing industrial operations in a wireless data network. Example location services for IIoT devices can include tracking locations of sensors, machinery, lifts, trains, assets along a conveyor belt, tools, positions of robots, etc.

Efforts at standardizing location technologies in 5G and/or WiFi have various disadvantages. Example ranging protocols to identify a distance between two wireless devices include Fine Timing Measurement Protocol (FTM) in IEEE 802.11mc/az, and Time Difference of Arrival (TDOA). A problem with the proposed ranging protocols is that they require wide bandwidths (e.g., 160 MHz is required for 1 meter accuracy); use of wide bandwidths, however, results in poor performance for data services due overlap in channelization resulting in large inter-access point (AP) interference, co-channel interference, poor signal to noise ratios, etc.

BRIEF DESCRIPTION OF THE DRAWINGS

Reference is made to the attached drawings, wherein elements having the same reference numeral designations represent like elements throughout and wherein:

FIGS. 4A-4C illustrate interfering and non-interfering wireless regions within the WLAN of FIG. 1, according to an example embodiment.

DESCRIPTION OF EXAMPLE EMBODIMENTS

Overview

Figure 1:
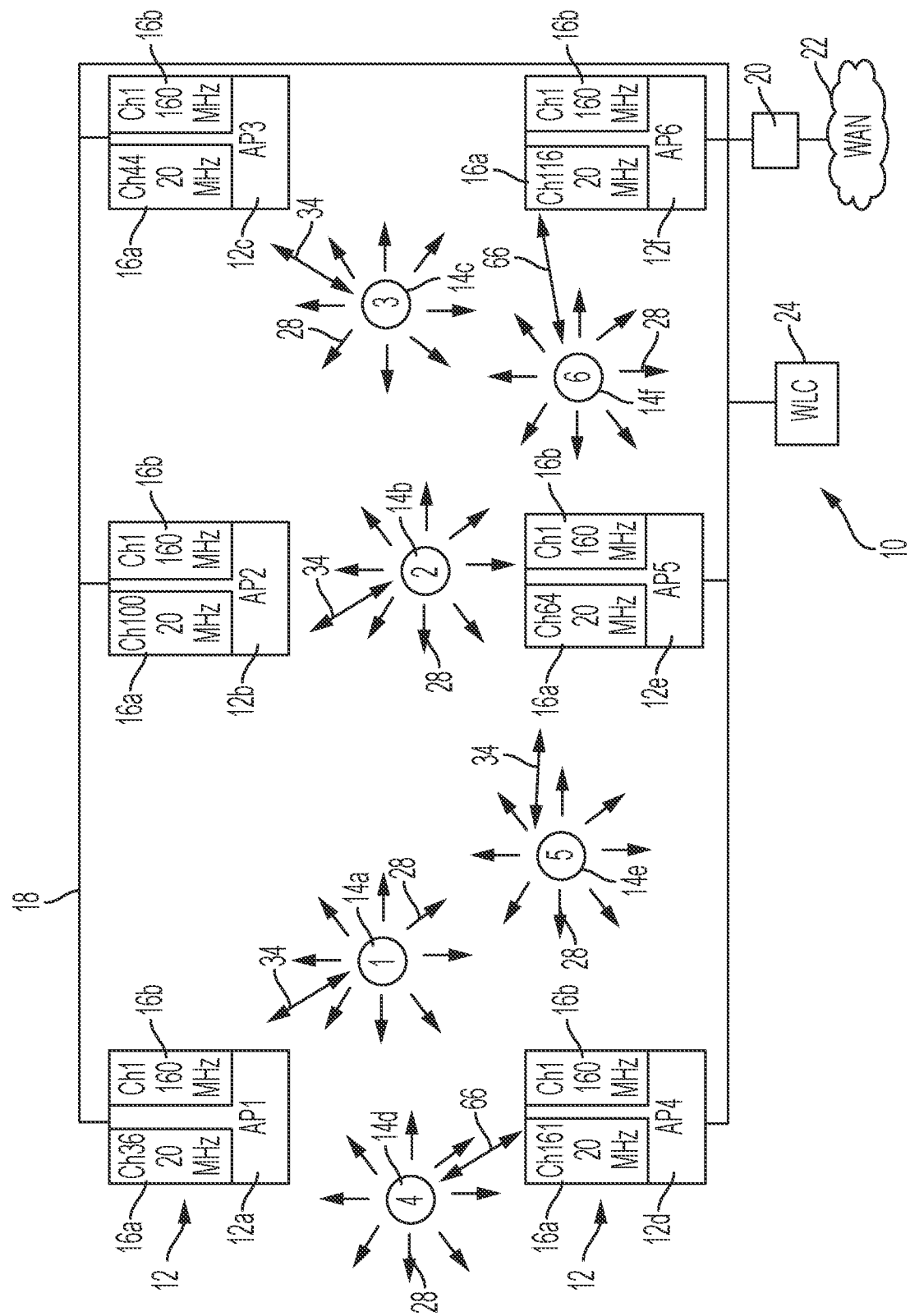
FIG. 1 illustrates an example wireless local area network (WLAN) having an apparatus for locating wireless client devices based on exchange of wireless data units, within non-interfering location service intervals allocated to respective wireless client devices on a wide-bandwidth channel that is shared among AP devices and that is distinct from a concurrently-available low-bandwidth reliable data service channel, according to an example embodiment.

In one embodiment, a method comprises: first causing, by a controller device, wireless access points (APs) to allocate first non-interfering wireless channels for a prescribed reliable data service for wireless client devices in a wireless local area network (WLAN); second causing, by the controller device, the wireless APs to allocate a second shared channel having a bandwidth that is at least twice the corresponding bandwidth of any of the first non-interfering wireless channels; allocating for each wireless client device, by the controller device, a corresponding location service interval on the second shared channel for transmission of at least a corresponding identifiable wireless data unit for locating the corresponding wireless client device between two or more of the wireless APs; and determining, by the controller device, a location of at least one of the wireless client devices based on reception of at least the corresponding wireless data unit between the one wireless client device and the two or more wireless APs during the corresponding location service interval.

In another embodiment, an apparatus is implemented as a physical machine and comprises: non-transitory machine readable media configured for storing executable machine readable code; a device interface circuit configured for receiving data having been forwarded via a wireless local area network (WLAN); and a processor circuit. The processor circuit is configured for executing the machine readable code, and when executing the machine readable code operable for: first causing, as a controller device, wireless access points (APs) to allocate first non-interfering wireless channels for a prescribed reliable data service for wireless client devices in the WLAN; second causing the wireless APs to allocate a second shared channel having a bandwidth that is at least twice the corresponding bandwidth of any of the first non-interfering wireless channels; allocating, for each wireless client device, a corresponding location service interval on the second shared channel for transmission of at least a corresponding identifiable wireless data unit for locating the corresponding wireless client device between two or more of the wireless APs; and determining a location of at least one of the wireless client devices based on reception of at least the corresponding wireless data unit between the one wireless client device and the two or more wireless APs during the corresponding location service interval.

In another embodiment, one or more non-transitory tangible media encoded with logic for execution by a machine and when executed by the machine operable for: first causing, by the machine implemented as a controller device, wireless access points (APs) to allocate first non-interfering wireless channels for a prescribed reliable data service for wireless client devices in a wireless local area network (WLAN); second causing, by the controller device, the wireless APs to allocate a second shared channel having a bandwidth that is at least twice the corresponding bandwidth of any of the first non-interfering wireless channels; allocating for each wireless client device, by the controller device, a corresponding location service interval on the second shared channel for transmission of at least a corresponding identifiable wireless data unit for locating the corresponding wireless client device between two or more of the wireless APs; and determining, by the controller device, a location of at least one of the wireless client devices based on reception of at least the corresponding wireless data unit between the one wireless client device and the two or more wireless APs during the corresponding location service interval.

DETAILED DESCRIPTION

Particular embodiments enable a deployment of a wireless local area network (e.g., 5G, WiFi, etc.) that can optimize reliable data services and precise location services (providing a location detection accuracy of one meter or less) in a scalable manner, based on utilizing a reliable data service channel for allocating non-interfering location service intervals to respective wireless client devices for location detection on a wide-bandwidth ("wideband") wireless channel. The scheduling and allocating of non-interfering location service intervals (via a reliable data service channel) ensures that no other wireless client device interferes with a wireless client device executing location detection operations with a plurality of nearby access point (AP) devices (e.g., WiFi AP, 5G cell tower, etc.).

Moreover, the example embodiments can optimize reliable data services concurrently with optimizing precise location services for different types of wireless client devices, including single channel-only devices having a single wireless transceiver for tuning to a selected wireless channel at any time, and multiple-channel devices having two or more wireless transceivers for concurrent communications on two or more wireless channels. Hence, single channel-only devices can utilize the precise location services based on temporarily switching from a reliable data service channel (utilized for CSMA/CA based asynchronous data services) to the wideband wireless channel at the allocated location service interval, where "location service interval" is defined herein as a unique time interval having an identified start time (e.g., relative to an identifiable network clock or local clock) and a prescribed duration, described in further detail below. Multiple-channel devices can use the wideband wireless channel for CSMA/CA based asynchronous data services during unallocated ("open") time periods where no location service interval is allocated.

Additional embodiments enable overlapping location service intervals based on identifying non-interfering wireless regions in the WLAN; hence, overlapping location service intervals can be "non-interfering" if the respective wireless client devices are located, respectively, in mutually non-interfering wireless regions. Hence, the combined reliable data services and precise location services can be deployed in a scalable manner.

FIG. 1 is a diagram illustrating an example wireless local area network (WLAN) 10 having a plurality of wireless access point devices (APs) 12 (e.g., 12*a* through 12*o* for wireless communications with wireless client devices 14 (e.g., 14*a* through 14*o*, according to an example embodiment. Each of the wireless AP devices 12 can be implemented, for example, as an IEEE 802.11az, 802.11be, and/or 802.11mc compliant "WiFi" AP device (or a 5G cell tower), modified as described herein. Each wireless AP device 12 comprises two or more transceiver circuits 16, namely a "low-bandwidth" transceiver circuit 16*a* and a "wideband" transceiver circuit 16*b* that has a bandwidth of at least twice the bandwidth of the first (lowband) transceiver circuit 16*a*. The first (lowband) transceiver circuit 16*a* is capable of providing reliable data services at lower bandwidths, for example 20 MHz or 40 MHz. Hence, typical wireless network traffic is typically transmitted on the reliable data service channel (also referred to as reliable data service channel traffic 34).

Each of the wireless AP devices 12 can be interconnected via a wired data link 18, illustrated in a "bus" topology, although a "star" topology can be deployed based on connecting each wired data link from a corresponding wireless AP device 12 to an IEEE 802.3 "Ethernet" switching device. Hence, each transceiver circuit 16 can comprise at least a first (lowband) transceiver circuit 16*a*, a second (wideband) transceiver circuit 16*b*, and a wired interface circuit (not shown).

The WLAN 10 also can comprise a routing device and security appliance (e.g., "firewall") 20 that enables the wireless client devices 14 to communicate with remote destinations via a private and/or public Wide Area Network (WAN) 22 such as the Internet. The WLAN 10 also can optionally include a wireless LAN controller (WLC) 24, for example a commercially-available Cisco® Catalyst 9800 Series Wireless Controller (modified as described herein) from Cisco Systems, San Jose, Calif.

As described previously, the second (wideband) transceiver circuit 16*b* in each wireless AP device 12 has a bandwidth of at least twice the bandwidth (e.g., 40 MHz) of the first (lowband) transceiver circuit 16*a*. In particular, a wide bandwidth (e.g., of at least 80 MHz) is needed in the frequency domain in order to obtain precise time measurements in the time domain: for example, a reasonably precise location accuracy requires around a nanosecond of precision, thus requiring a bandwidth of at least 80 MHz; location accuracy having a precision on the order of one meter or less requires a bandwidth of about 160 MHz or more. Hence, a second (wideband) transceiver circuit 16*b* having a bandwidth of 160 MHz or more can support location services providing a location precision of one meter or less: as wireless frequency channels become available in the 6 GHz band, location services can be deployed with a precision of one meter or less based on a second (wideband) transceiver circuit 16*b* having a 160 MHz bandwidth.

Prior efforts at locating wireless devices have not provided reliable location detection in a scalable manner. Any attempt to use IEEE 802.11az and/or 802.11mc involves time-based ranging between two devices based on insertion of timestamp values within transmitted data packets. Timestamp values, however, are necessarily dependent on local clock values, and therefore any ranging between the wireless devices is subject to variations in local clock values between transmitting and receiving devices; further, inherent errors encountered in multipath transmissions would result in a need for a wideband wireless transmission channel to overcome the multipath errors. Wireless wideband channels, however, are rarely deployed in wireless communications systems due to the limited number of available channels between neighboring wireless access devices. As described previously, use of wide bandwidths results in poor performance for data services due to co-channel interference, poor signal to noise ratios, etc.

Figure 5A:
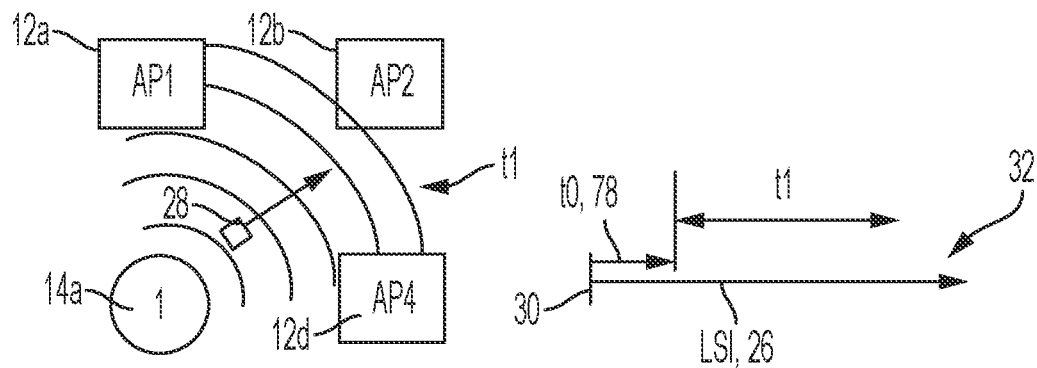
FIGS. 5A-5C illustrate example location detection operations within an allocated location service interval (LSI) between a corresponding wireless client device and a plurality of AP devices, according to an example embodiment.
Figure 5B:
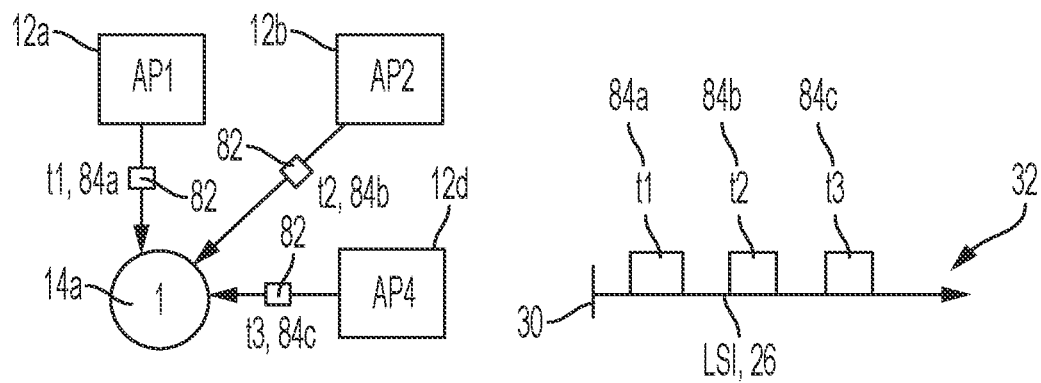
Figure 5C:
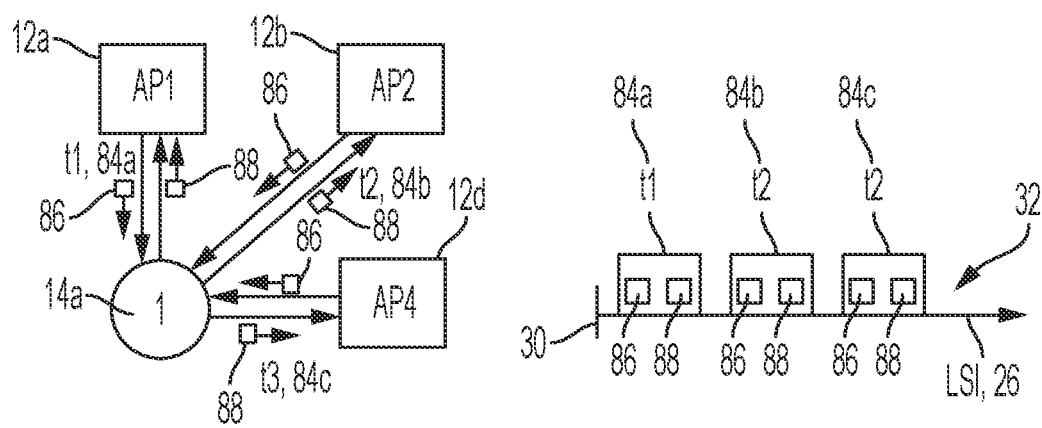

Hence, the example embodiments enable scalable deployment of reliable data services, concurrent with scalable deployment of precise location services, based on scheduling and allocating of non-interfering location service intervals to each of the wireless client devices 14. As described below, each wireless client device 14 can be configured for exchanging, within its corresponding allocated non-interfering location service interval (26 of FIGS. 5A-5C), one or more wireless data units (e.g., minimum-size "blink" packets or "blinks") 28 with a plurality of neighboring wireless AP devices 12 (e.g., 12a, 12b, 12d) that can detect the wireless data units 28. As illustrated in FIGS. 5A-5C, each location service interval 26 that is allocated to a wireless client device 14 (e.g., 14a) has a corresponding start instance 30 and a prescribed interval duration 32 that ensures that no other wireless client device 14 (e.g., 14b through 140 interferes with the transmitting wireless client device 14 (e.g., 14a) at its allocated location service interval 26. As described below, non-interfering overlapping location service intervals 26 can be allocated to two wireless client devices 14 (e.g., 14c and 14d) based on determining the non-neighboring wireless client devices 14 are detectable by non-neighboring wireless AP devices 12, for example the wireless client device 14d is detectable by wireless AP device 12a and the wireless AP device 12d (but not 12c or 12f), and the wireless client device 14c is detectable by the wireless AP device 12c and the wireless AP device 12f (but not 12a or 12d).

Figure 2:
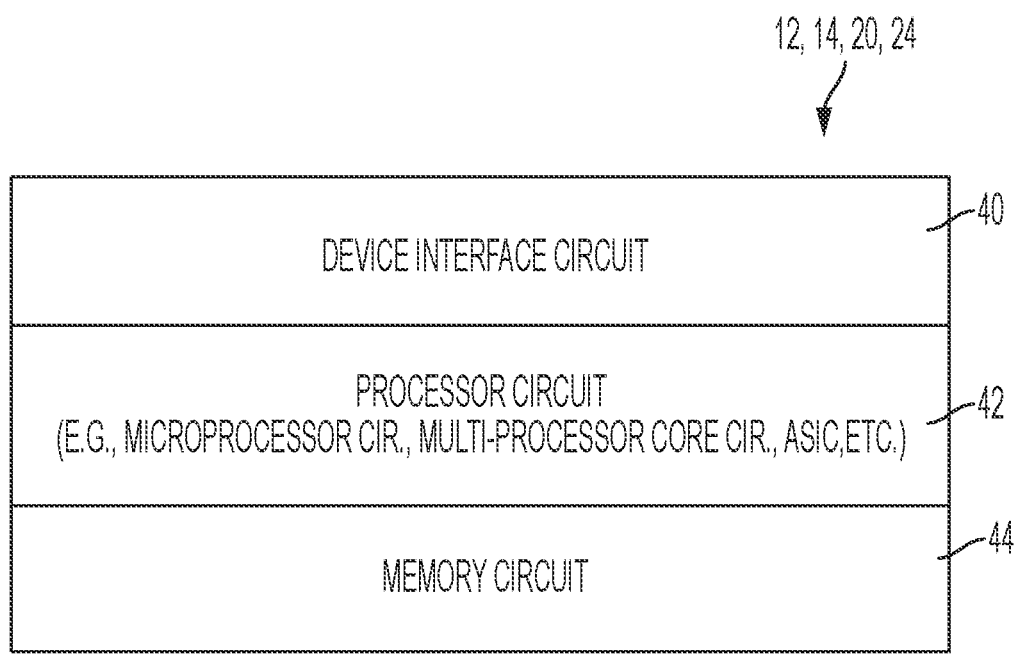
FIG. 2 illustrates an example implementation of any one of the devices of FIG. 1, according to an example embodiment.

FIG. 2 illustrates an example implementation of any one of the devices 12, 14, 20, and/or 24 of FIG. 1, according to an example embodiment. Each apparatus 12, 14, 20, and/or 24 is a physical machine (i.e., a hardware device) configured for implementing network communications with other physical machines 12, 14, 20, and/or 24 via the network 10. The term "configured for" or "configured to" as used herein with respect to a specified operation refers to a device and/or machine that is physically constructed and arranged to perform the specified operation. Hence, the apparatus 12, 14, 20, and/or 24 is a network-enabled (user machine providing user access to a network)/machine implementing network communications via the network 10.

Each apparatus 12, 14, 20, and/or 24 can include a device interface circuit 40, a processor circuit 42, and a memory circuit 44. The device interface circuit 40 can include one or more distinct physical layer transceivers for communication with any one of the other devices 12, 14, 20, and/or 24; for example, the device interface circuit 40 can include an IEEE based Ethernet transceiver for communications with the devices of FIG. 1 via any type of data link (e.g., a wired or wireless link, an optical link, etc.); hence, although not shown in FIG. 2, the device interface circuit 40 of each wireless AP device 12 can include an IEEE 802.11 based first (lowband) transceiver circuit 16a, an IEEE 802.11 based second (wideband) transceiver circuit 16b, and a wired IEEE 802.3 transceiver circuit (other types of wireless transceivers can be used for 5G, etc. deployment).

The device interface circuit 40 of each wireless client device 14 also includes at least one wireless IEEE 802.11 transceiver circuit that can operate at either the lowband reliable data service channels or the wideband channels, described below: a wireless client device 14 that includes only one wireless IEEE 802.11 transceiver circuit is referred to herein as a single channel-only device that needs to tune between different frequency channels; a wireless client device 14 that includes two or more IEEE 802.11 transceiver circuits can concurrently communicate on a lowband reliable data service channel (using one transceiver) and a wideband channel (using a second transceiver).

The processor circuit 42 can be configured for executing any of the operations described herein, and the memory circuit 44 can be configured for storing any data or data packets as described herein.

Any of the disclosed circuits of the devices 12, 14, 20, and/or 24 (including the device interface circuit 40, the processor circuit 42, the memory circuit 44, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit (s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

Figure 3A:
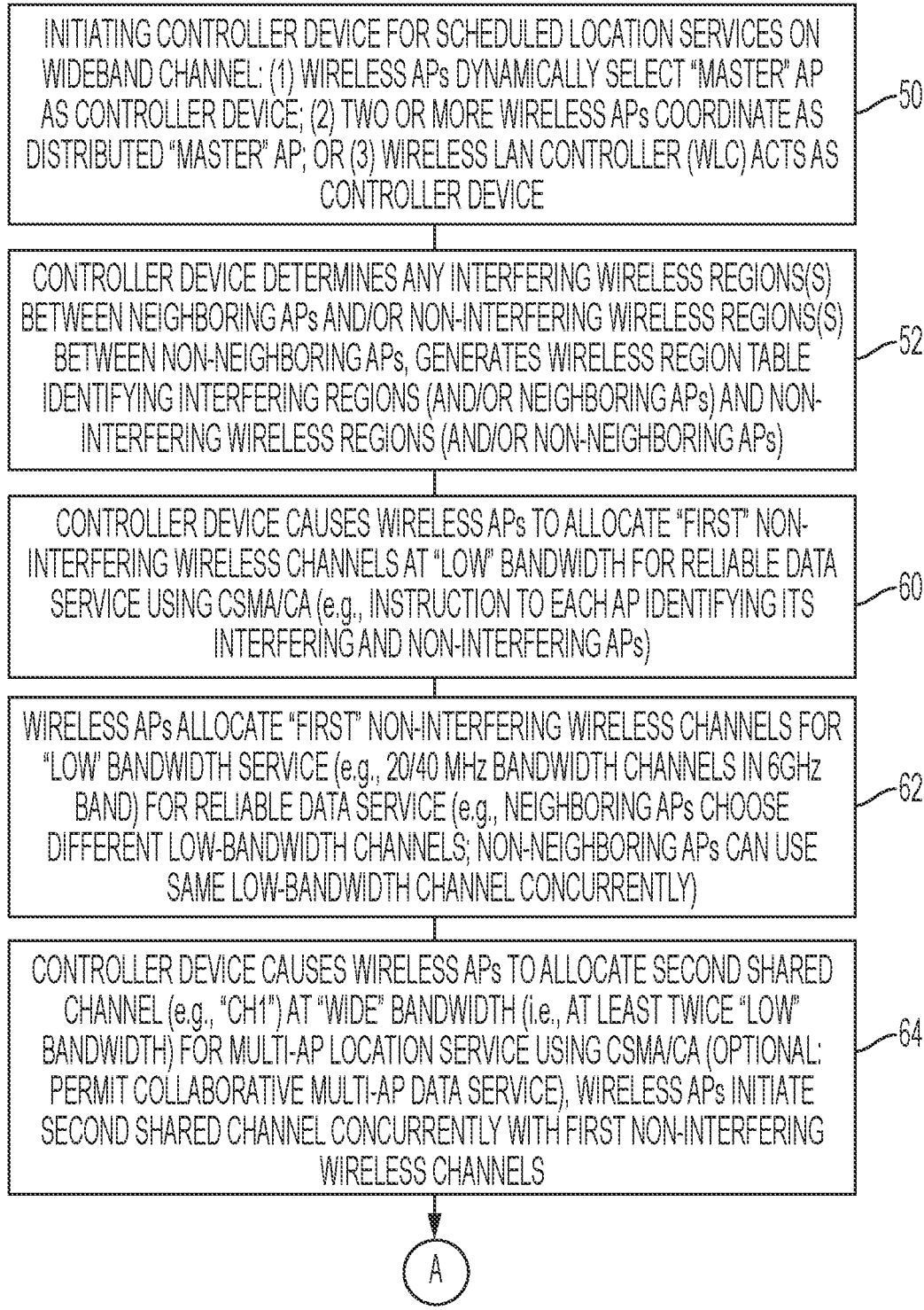
FIGS. 3A-3B illustrate an example method for locating wireless client devices based on exchange of wireless data units, within non-interfering location service intervals allocated to respective wireless client devices on a shared wide-bandwidth channel, according to an example embodiment.
Figure 3B:
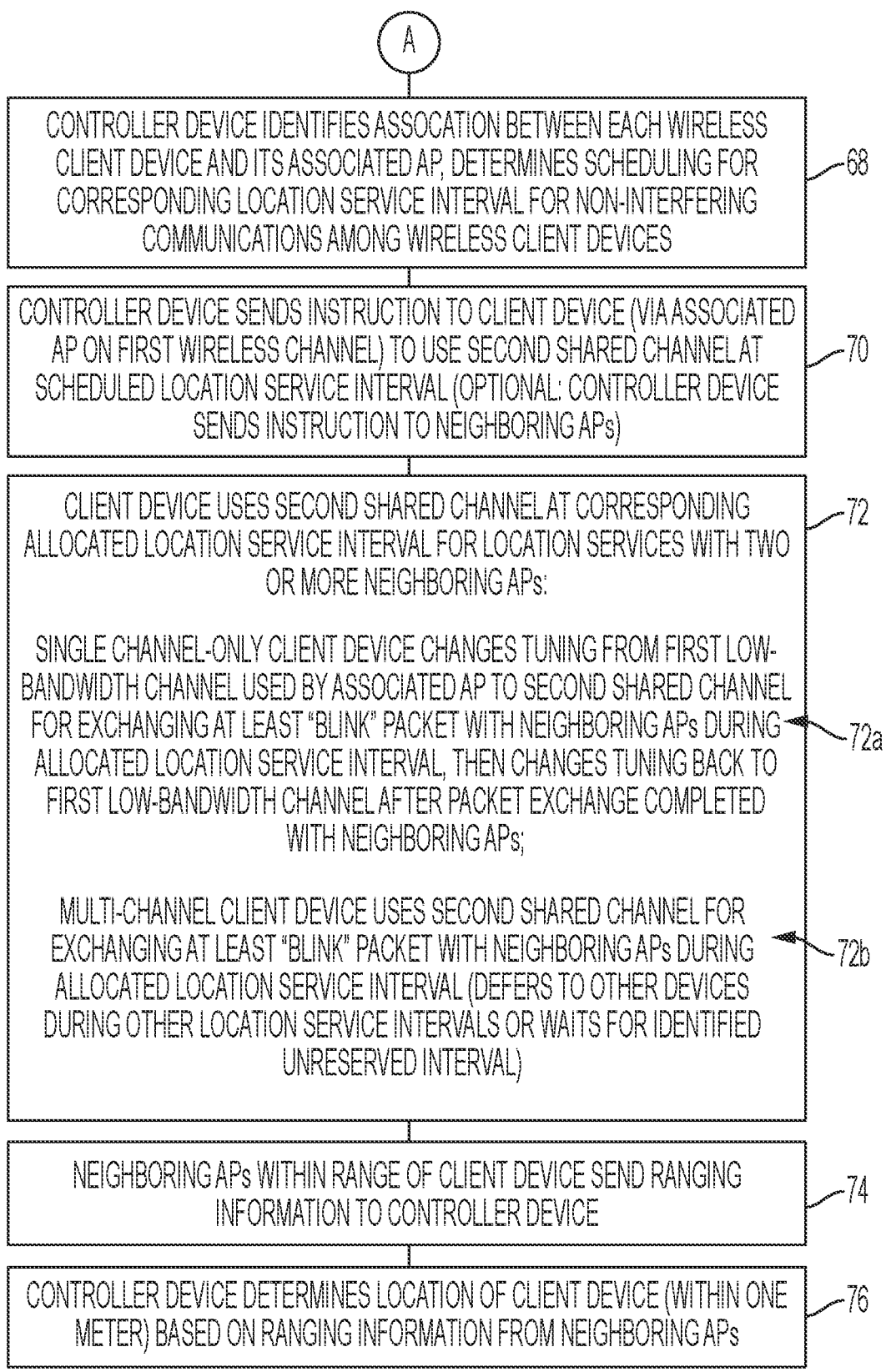

FIGS. 3A-3B illustrate an example method for locating wireless client devices based on exchange of wireless data units, within non-interfering location service intervals allocated to respective wireless client devices on a shared wide-bandwidth channel, according to an example embodiment.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Referring to FIG. 3A, a controller device is initiated in operation 50 for execution of allocating non-interfering reliable data service channels among the wireless AP devices 12, and allocating non-interfering location service intervals 26 used by the respective wireless client devices 14 on the wideband wireless channel shared by the wireless AP devices 12. In one example embodiment, wireless AP devices 12 can dynamically select a "master" AP device 12 (e.g., 12b) to operate as a controller device for the WLAN 10: for example, the processor circuit 42 of an identified one of the wireless client devices 14 in operation 50 can "identify" or "claim" itself as a "master" AP device 12 and wait a prescribed interval to determine if another wireless AP device 12 claims to be the "master" AP device; other techniques can be utilized to elect a "master" AP device to operate as the controller device, for example according to IEEE 802.11be. In another example embodiment, two (2) or more wireless AP devices 12 in operation 50 can coordinate as distributed "master" AP devices (e.g., the first two AP devices that identify themselves as co-masters), etc. Hence, all AP devices 12 can be under supervision of the master AP device (e.g. 12b).

In another embodiment, the WLC 24 can be deployed in operation 50 as a centralized controller device that executes the allocations as described herein with respect to FIGS. 3A and 3B. For purposes of simplifying the subsequent description, the controller device will be described with reference to the example deployment using the WLC 24, with the understanding that one or more wireless AP devices 12 can be alternately used as the controller device described herein.

Figure 4C:
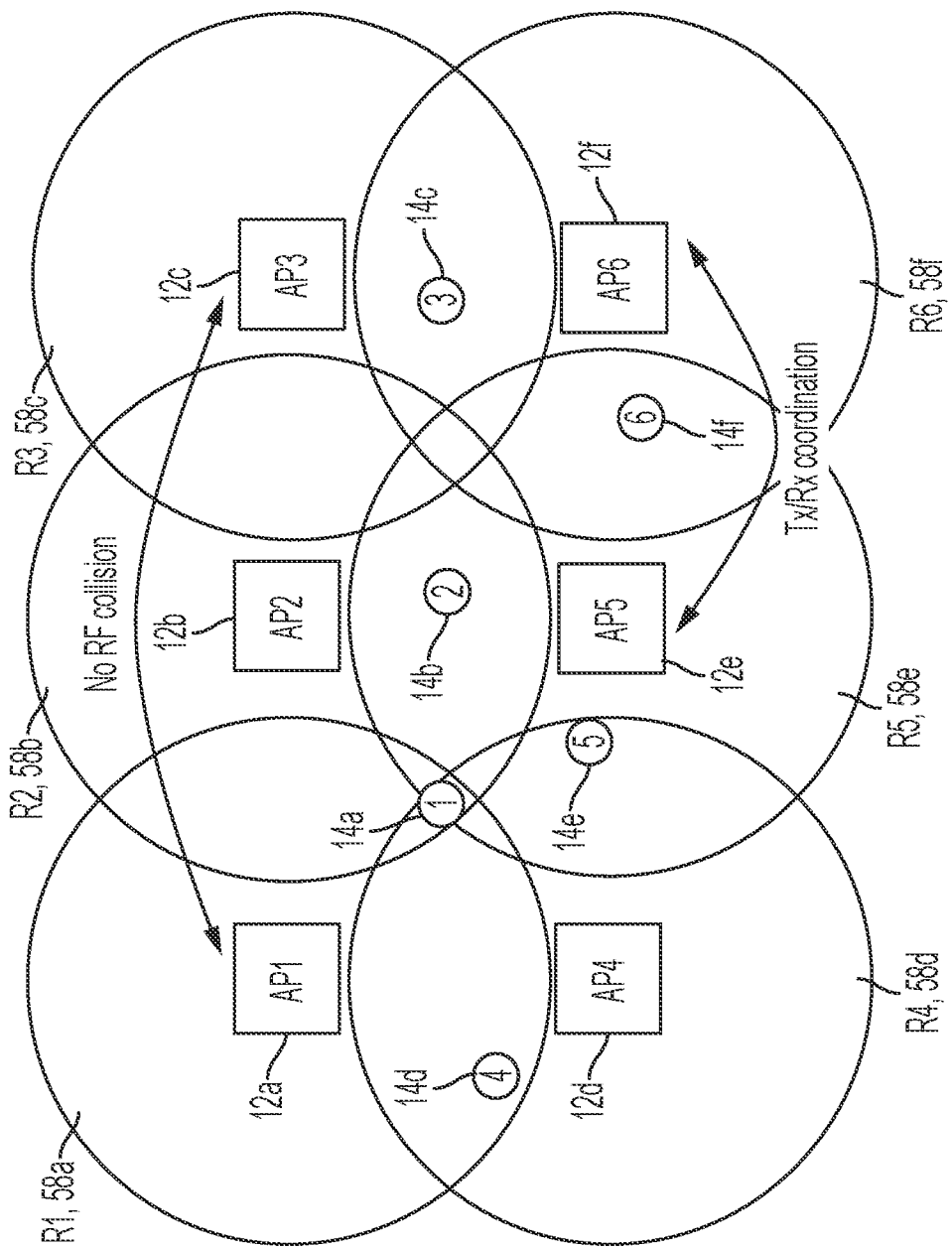

Following initiating of the controller device (e.g., the WLC 24 or a master AP such as the wireless AP device 12a) in operation 50, the processor circuit 42 of the WLC 24 determines in operation 52 whether there are any interfering wireless regions between neighboring wireless AP devices 12. As illustrated in FIGS. 4A, 4B, and 4C, the processor circuit 42 of a controller device (e.g., a WLC 24) can identify interfering wireless regions (54 of FIG. 4A) and non-interfering wireless regions (56 of FIG. 4B) from among the wireless regions (e.g., "R1" through "R6") 58, also referred to as propagation areas. For example, the processor circuit 42 of the controller device (e.g., a WLC 24) can cause each of the wireless AP devices 12 to transmit a wireless probe message (e.g., an IEEE 802.11 Fine Time Measurement (FTM) message specifying the source address of the transmitting wireless AP device 12), causing each WLC 24 having received the wireless probe message (above a prescribed signal to noise ratio) from a neighboring AP device 12 to report the transmitted probe message to the controller device. The controller device can determine a cutoff threshold below which wireless AP devices 12 are deemed below FTM transmit collision thresholds, enabling non-neighboring AP devices (e.g., 12a and 12c) to transmit at the same time with a high probability of success, even if the AP devices are within RF transmission range of each other, because FTM messages are sent at low Modulation Coding Schemes (MCS), thus are tolerant to high noise levels.

The processor circuit 42 of the controller device in operation 52 also can monitor communications 34 on a given low-bandwidth channel to determine if there are any collisions encountered between wireless client devices (e.g., 14a and 14c, 14b and 14d, etc.) to determine client-based non-RF overlapping regions or client-based overlapping RF regions (as opposed to AP-based interfering wireless regions illustrated in table 54, or AP-based non-interfering wireless regions as illustrated in table 56).

Hence, the processor circuit 42 of the controller device in operation 52 can generate and store in its memory circuit 44 a data structure 54, illustrated in FIG. 4A, that identifies the interfering wireless regions. As illustrated in FIG. 4A, the processor circuit 42 of the controller device in operation 52 can determine the wireless region "R1" 58a (generated by the wireless AP device 12a) can interfere with the wireless regions "R2" 58b, "R4" 58d, and "R5" 58e based on a copy of a probe message transmitted by the wireless AP device 12a being received and forwarded to the controller device (e.g., 24) by the wireless AP devices 12b, 12d, and 12e, respectively. The processor circuit 42 of the controller device in operation 52 also can determine that the wireless region "R2" 58b (generated by the wireless AP device 12a) can interfere with each of the remaining wireless regions "R1" 58a, "R3" 58c, "R4" 58d, "R5" 58e, and "R6" 58f based on a copy of a probe message transmitted by the wireless AP device 12b being received and forwarded to the controller device (e.g., 24) by the wireless AP devices 12a, 12c, 12d, 12e, and 12f. As illustrated in FIG. 4A, similar interference relationships for wireless regions 58c, 58d, 58e, and 58f can be determined based probe messages transmitted by the wireless AP device 12c, 12d, 12e, and 12f.

Similarly, the processor circuit 42 of the controller device (e.g., 24) in operation 52 can generate and store in its memory circuit 44 a data structure 56 identifying non-interfering wireless regions, based on determining a wireless AP device 12 (e.g., 12c) has failed to detect a probe message from another wireless AP device 12 (e.g., 12a). Hence, the processor circuit 42 of the controller device in operation 52 can determine: the wireless region "R1" 58a (generated by the wireless AP device 12a) does not interfere with the wireless regions "R3" 58c or "R6" 58f generated by the wireless AP devices 12c and 12f, respectively; the wireless region "R3" 58c (generated by the wireless AP device 12c) does not interfere with the wireless regions "R1" 58a or "R4" 58d generated by the wireless AP devices 12a and 12d, respectively; the wireless region "R4" 58d (generated by the wireless AP device 12d) does not interfere with the wireless regions "R3" 58c or "R6" 58f generated by the wireless AP devices 12c and 12f, respectively; and the wireless region "R6" 58f (generated by the wireless AP device 12o) does not interfere with the wireless regions "R1" 58a or "R4" 58d generated by the wireless AP devices 12a and 12d, respectively.

The processor circuit 42 of the controller device can also update the tables 54 and/or 56, as appropriate, based on updated conditions detected as described above from AP-based ranging, monitoring collisions on any reliable data service channel traffic 34 (or collisions encountered on the reliable data service channel), and/or monitoring collisions on any collaborative multi-AP data services 66 utilizing the second shared wideband traffic for unscheduled traffic (also referred to as unscheduled wideband traffic 66).

The processor circuit 42 of the controller device also can utilize the FTM messages between the wireless AP devices 12 to determine the location of each of the wireless AP devices 12, for example as a supplement or verification of existing surveys marking the physical locations of the respective wireless AP devices 12 during installation in the WLAN 10.

The processor circuit 42 of the controller device (e.g., 24) in operation 60 can cause the wireless AP device 12a to allocate "first" non-interfering wireless channels at the "low" bandwidth (e.g., 20/40 MHz) for reliable data service, for example based on explicitly specifying for each wireless AP device 12 a corresponding channel for use by its corresponding first (lowband) transceiver circuit 16a (e.g., channels "36", "100", "44" "161", "64", and "116") for AP devices 12a, 12b, 12c, 12d, 12e, and 12f, respectively.

The processor circuit 42 of the controller device (e.g., 24) in operation 60 can optionally use the identification of the interfering wireless regions 58 (as in the interfering wireless region table 54) and/or the identification of non-interfering wireless regions 58 (as in the non-interfering wireless region table 56), for example to generate "shared" low-bandwidth channels among non-interfering wireless AP devices, for example causing the first (lowband) transceiver circuit 16a of AP1 12a and AP3 12c to use the "low" bandwidth channel "36", and causing the first (lowband) transceiver circuit 16a of the AP4 12d and AP 6 12f to use the "low" bandwidth channel "161". The processor circuit 42 of the controller device (e.g., 24) in operation 60 also can send the interfering wireless region table 54 and/or the non-interfering wireless region table 56 to each of the wireless AP devices 12 to cause the wireless AP devices 12 to auto-negotiate, among their neighboring wireless AP devices 12 in their interference domain, their respective "first" non-interfering wireless channels at the "low" bandwidth. Hence, the processor circuit 42 of the controller device can identify wireless client device and/or wireless AP transmissions that need location service intervals 26 to be coordinated in order to avoid collisions due to interfering wireless regions, as opposed to non-interfering wireless regions (or non-interfering wireless AP devices 12 or wireless client devices 14) that do not require coordination of the respective location service intervals 26.

Hence, the wireless AP devices 12 in operation 62 can allocate their respective "first" non-interfering wireless channels on their first (lowband) transceiver circuit 16a at the "low" bandwidth (e.g., 20/40 MHz) for reliable data service; in one embodiment as described previously, non-neighboring wireless AP devices 12 (as illustrated with respect to FIG. 4B) can use the same low-bandwidth channel concurrently without interference.

The processor circuit 42 of the controller device (e.g., the WLC 24) in operation 64 can also cause the wireless AP devices 12 to allocate their second (wideband) transceiver circuit 16b to a second shared wideband channel (e.g., 160 MHz) having at least twice the bandwidth as the "first" reliable data service channel. For example, the processor circuit 42 of the controller device can output to each wireless AP device 12 an instruction that explicitly specifies a wideband channel "Ch1" (e.g., within a prescribed 6 GHz band) is to be used for multi-AP location service using CSMA/CA (carrier sense with multiple access/collision avoidance) mechanisms. The processor circuit 42 of the controller device (e.g., the WLC 24) in operation 64 also can permit collaborative multi-AP data services 66 on the "second" shared wideband channel, for example based on IEEE802.11be, where the neighboring transceiver circuit 16s can collaborate as needed for sharing data channels, or non-neighboring APs (e.g., AP4, AP6) can permit simultaneous non-interfering transmissions (e.g., by wireless client devices 14d, 14f) during intervals that are not reserved for any location service intervals 26 by the controller device.

Referring to FIG. 3B, the processor circuit 42 of the controller device (e.g., the WLC 24) in operation 68 can identify one or more associations between each wireless client device 14 (e.g., 14a) and a corresponding one or more wireless AP devices 12 providing a wireless connection for the wireless client device 14. As illustrated in FIGS. 1 and 5A-5C, the processor circuit 42 of the controller device in operation 68 can determine the wireless client device 14a is associated with the wireless AP device 12a, and that the wireless client device 14a also can communicate with the wireless AP devices 12b and 12d; the processor circuit 42 of the controller device also can determine: the wireless client device 14b is associated with the wireless AP device 12b and can also communicate with the wireless AP device 12e; the wireless client device 14c is associated with the wireless AP device 12c and can also communicate with the wireless AP device 12b and the wireless AP device 12f; the wireless client device 14d is associated with the wireless AP device 12d, and can also communicate with the wireless AP device 12a; the wireless client device 14e is associated with the wireless AP device 12e and also can communicate with the wireless AP device 12d and the wireless AP device 12b; and the wireless client device 14f is associated with the wireless AP device 12f and can also can communicate with the wireless AP device 12c.

Hence, the processor circuit 42 of the controller device (e.g., the WLC 24) in operation 68 can determine the scheduling for a corresponding non-interfering location service interval 26 on the second shared wideband channel for each wireless client device 14. As described previously, overlapping location service intervals 26 for wireless AP devices 12 (e.g., 14c and 14d) that are within non-interfering wireless regions (e.g., 58a and 58d do not overlap with 58c and 58d), hence the processor circuit 42 of the controller device can optionally allocate overlapping location service interval 26 to the wireless client device 14c and 14d that are in the non-interfering wireless regions 58a/58d and 58c/58f. The processor circuit 42 can schedule the location service interval 26 for each wireless client device 14 on a periodic basis, for example repeating every five minutes, etc., enabling allocation of the remaining bandwidth for other collaborative multi-AP data services 66 utilizing the second shared wideband traffic for unscheduled traffic (also referred to as unscheduled wideband traffic 66).

The processor circuit 42 of the controller device in operation 70 can unicast transmit to each wireless client device 14 (via the associated wireless AP device 12 on the reliable data service channel) an instruction specifying the allocated non-interfering location service interval 26 to be used by the wireless client device 14 in executing a location operation with its neighboring wireless AP devices 12 on the second shared wideband channel. The processor circuit 42 of the controller device also can send the instruction to at least the neighboring wireless AP devices 12 to ensure there is no interference by any other collaborative multi-AP data service 66.

Each wireless client device 14 in operation 72 can respond to the instruction specifying its corresponding non-interfering location service interval 26 by accessing, at the start instance 30 of the location service interval 26, the second shared wideband channel for execution of location services with its neighboring wireless AP devices 12.

In one example, a wireless client device 14 configured as a single channel-only client device (having only a single wireless transceiver circuit) in operation 72a can change at its corresponding allocated start instance 30 the tuning of its single wireless transceiver circuit from the first low-bandwidth reliable data service channel used by its associated wireless AP device 12 to the second shared wideband channel for executing location detection operations, described in further detail below with respect to FIGS. 5A-5C. The single channel-only client device 12, upon completion of its location detection operations before the interval duration 32 following the corresponding start instance 30, can change its tuning of its single wireless transceiver circuit from the second shared wideband channel back to the first low-bandwidth reliable data service channel. The start instance 30 can be based on an epochal network time; alternately the start instance 30 can be configured to start a prescribed number of milliseconds after transmission (by the associated wireless AP device 12) of the instruction transmitted in operation 70, eliminating any errors due to variations in local clock values relative to the network clock.

Figure 6:
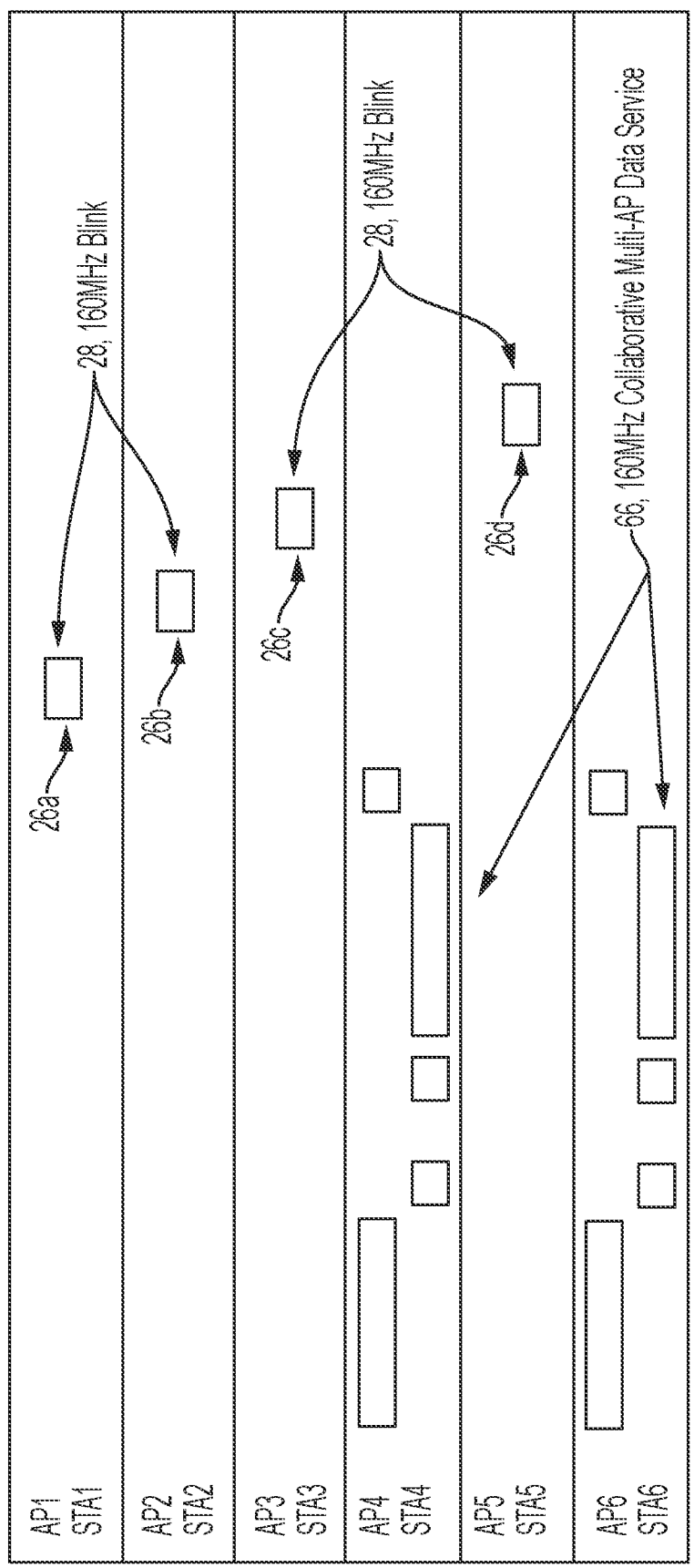
FIG. 6 illustrates an example allocation of location service intervals on a wide-bandwidth channel to respective wireless client devices, and transmission of data on the wide-bandwidth channel at unallocated intervals, according to an example embodiment.

In another example, a wireless client device 14 configured as a multiple-channel client device (having two more wireless transceiver circuits) can use in operation 72b the second shared wideband channel for executing location detection operations during its allocated location service interval 26. Although the wireless client device 14 having two or more wireless transceiver circuits can send and receive data traffic 34 as needed via the first low-bandwidth reliable data service channel, after expiration of its location service interval 26 the wireless client device 14 must defer any transmissions 66 on the second shared wideband channel during any allocated service intervals 26 allocated to any other wireless client device 14, as illustrated in FIG. 6.

Hence, like the single channel-only client device 14, a multiple-channel client device 14 in operation 72b can execute location operations during its allocated location service interval 26, but then can only transmit on the second shared wideband channel during identified unreserved intervals. Hence, the processor circuit 42 of the controller device (e.g., 24) can cause the wireless AP devices 12 to advertise (e.g., via the first low-bandwidth reliable data service channel) identification of unreserved intervals on the second shared wideband channel for ad-hoc CSMA/CA communications (e.g., 66 of FIG. 6) by any of the multiple-channel client devices.

The neighboring wireless AP devices 12 that are within range of a wireless client device 14 can respond to the location detection operations of a wireless client device 14 during its corresponding location service interval 26 by sending ranging information in operation 74, described below, to the controller device (e.g., 24).

Hence, the controller device (e.g., 24) in operation 76 can determine the location of a wireless client device 14 (e.g., within one meter) based on the ranging information supplied in operation 74 by the neighboring wireless AP device 12. As illustrated in FIGS. 5A-5C, different location detection operations can be implemented within a location service interval 26. Referring to FIG. 5A, the wireless client device 14 (e.g., 14a) can execute a location detection operation based on outputting a single "blink" packet 28 as a corresponding identifiable wireless data unit that can include at least a preamble and a device address (e.g., UUID or MAC address): the instructions sent by the controller device in operation 70 can specify, in addition to the start instance 30 and the interval duration 32 for the corresponding location service interval 26, a corresponding trigger interval "t0" 78 that identifies the precise instance (e.g., a prescribed number of milliseconds after the start instance 30) that the wireless client device 14a needs to transmit the "blink" packet 28. Hence, each of the wireless AP devices 12a, 12b, and 12d can record the precise arrival time of the blink packet 28 (with a nanosecond precision), and forward the respective recorded arrival times to the controller device (e.g., 24). Hence, the controller device can determine the location of the wireless client device 14a based on comparing the recorded arrival times (relative to the trigger interval "t0" 78 of the wireless client device 14a following the start instance 30). Hence, the location service interval 26 in FIG. 5A has an interval duration 32 of at least the trigger interval "t0" 78 following the start instance 30, plus a worst-case propagation delay "t1" for the wireless data unit 28 to reach the furthest wireless AP device 12.

FIG. 5B illustrates another location operation, where the wireless AP devices 12a, 12b, and 12d in operation 72 each can transmit, in sequence, a corresponding ranging packet 82 during respective transmission intervals "t1" 84a, "t2" 84b, and "t3" 84c: each ranging packet 82 can identify the transmitting wireless AP device 12, and optionally specify a precise timestamp identifying the transmission time. Hence, the wireless client device 14a can record the reception time of each ranging packet 82, and report the results to the controller device (e.g., WLC 24) via the reliable data service channel, enabling the controller device to determine the location of the wireless client device 14a based on the respective reception times relative to the known physical locations of the transmitting wireless AP devices 12a, 12b, and 12d, and the prescribed transmission start times of the respective transmission interval 84sa, 84b, and 84c. Location also can be determined based on the wireless client device 14 listening for IEEE 802.11az passive location packets during the location service interval 26 on the second shared wideband channel. FIG. 5C illustrates another location operation, where the wireless AP devices 12a, 12b, and 12d each can send a trigger packet 86 that causes the wireless client device 14a to transmit a response packet 88 a precise prescribed number of milliseconds after the trigger packet 86 ("trigger delay"). Hence, each wireless AP devices 12a, 12b, and 12d can record the turn-around-time between transmission of the trigger packet 86 and reception of the corresponding 88, enabling each wireless AP device 12 (or the controller device) to determine the corresponding propagation delay (Time Distance of Arrival (TDoA) based on the turn-around-time, minus the "trigger delay", divided by two (accounting for the transmissions of both the trigger packet 86 and the response packet 88). Hence, the controller device can determine the location of the wireless client device 14a based on the TDoA of the wireless client device 14 relative to the wireless AP devices 12a, 12b, and 12d.

According to example embodiments, a controller device can provide an optimization in concurrent reliable data services and location services on low-bandwidth reliable service channels and a shared wideband channel, respectively (along with collaborative shared services on the wideband channel), based on CSMA/CA. The example embodiments enable the scheduling of location service intervals without the necessity of any strict scheduling protocols such as a time division multiple access (TDMA) approach such as 6TiSCH, etc. Use of reliable data services on a low-bandwidth reliable service channel ensures data service requirements can be satisfied, including accommodating for longer transmission times ("air time"), and enabling improved separation between adjacent co-channel wireless AP devices 12 to reduce interference impact; use of a high-bandwidth shared channel optimizes location services that consume limited amount of data (requiring short and infrequent transmit opportunities (TxOP), while providing higher accuracy due to the wider bandwidth.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   first causing, by a controller device, wireless access points (APs) to allocate first non-interfering wireless channels for a prescribed reliable data service for wireless client devices in a wireless local area network (WLAN);
   second causing, by the controller device, the wireless APs to allocate a second shared channel having a bandwidth that is at least twice the corresponding bandwidth of any of the first non-interfering wireless channels;
   allocating for each wireless client device, by the controller device, a corresponding location service interval on the second shared channel for transmission of at least a corresponding identifiable wireless data unit for locating the corresponding wireless client device between two or more of the wireless APs; and
   determining, by the controller device, a location of at least one of the wireless client devices based on reception of at least the corresponding wireless data unit between the one wireless client device and the two or more wireless APs during the corresponding location service interval.

2. The method of claim 1, wherein the allocating ensures no other wireless client device interferes with the corresponding wireless client device on the second shared channel during the corresponding location service interval.

3. The method of claim 1, wherein the first non-interfering wireless channels and the second shared channel are concurrently available in the WLAN.

4. The method of claim 1, wherein the controller device is a first of the wireless APs, further comprising the first of the wireless APs selectively establishing itself as the controller device in the WLAN.

5. The method of claim 1, wherein the allocating comprises:
   causing a first of the wireless APs to transmit, on a corresponding allocated first non-interfering wireless channel, an instruction that causes a first of the wireless client devices to execute exchange of at least the corresponding identifiable wireless data unit on the second shared channel during the corresponding location service interval;
   wherein the first wireless device is one of a single channel-only device that tunes from one of the first non-interfering wireless channels to the second shared channel during the corresponding location service interval, then returns to the one first non-interfering wireless channel after the corresponding location service interval, or the first wireless device is a multiple-channel device that concurrently operates on the one first non-interfering wireless channel and the second shared channel.

6. The method of claim 1, further comprising:
   determining, by the controller device, one or more interfering wireless regions and one or more non-interfering wireless regions in the WLAN;
   identifying, from among the wireless APs, first APs associated with the one or more interfering wireless regions and second APs associated with the one or more non-interfering wireless regions; and
   scheduling a first portion of the location service intervals as non-overlapping among a first portion of the wireless client devices in the interfering wireless regions, ensuring no other wireless device interferes with the corresponding wireless client device on the second shared channel during the corresponding location service interval.

7. The method of claim 6, wherein the scheduling further comprises scheduling a second portion of the location service intervals as overlapping among a first of the wireless client devices in a first of the non-interfering wireless regions and a second of the wireless client devices in a second of the non-interfering wireless regions.

8. The method of claim 1, wherein each of the wireless APs and each of the wireless client devices operate in the WLAN according to a collision-avoidance based transmission.

9. The method of claim 1, wherein the bandwidth of the second shared channel enables determining the location of the at least one wireless client device to one meter or less within the WLAN.

10. An apparatus implemented as a physical machine, the apparatus comprising:
    non-transitory machine readable media configured for storing executable machine readable code;
    a device interface circuit configured for receiving data having been forwarded via a wireless local area network (WLAN); and
    a processor circuit configured for executing the machine readable code, and when executing the machine readable code operable for:
    first causing, as a controller device, wireless access points (APs) to allocate first non-interfering wireless channels for a prescribed reliable data service for wireless client devices in the WLAN,
    second causing the wireless APs to allocate a second shared channel having a bandwidth that is at least twice the corresponding bandwidth of any of the first non-interfering wireless channels,
    allocating, for each wireless client device, a corresponding location service interval on the second shared channel for transmission of at least a corresponding identifiable wireless data unit for locating the corresponding wireless client device between two or more of the wireless APs, and
    determining a location of at least one of the wireless client devices based on reception of at least the corresponding wireless data unit between the one wireless client device and the two or more wireless APs during the corresponding location service interval.

11. The apparatus of claim 10, wherein the allocating ensures no other wireless client device interferes with the corresponding wireless client device on the second shared channel during the corresponding location service interval.

12. The apparatus of claim 10, wherein the first non-interfering wireless channels and the second shared channel are concurrently available in the WLAN.

13. The apparatus of claim 10, wherein the controller device is a first of the wireless APs, further comprising the first of the wireless APs selectively establishing itself as the controller device in the WLAN.

14. The apparatus of claim 10, wherein the processor circuit is configured for executing the allocating based on:
   causing a first of the wireless APs to transmit, on a corresponding allocated first non-interfering wireless channel, an instruction that causes a first of the wireless client devices to execute exchange of at least the corresponding identifiable wireless data unit on the second shared channel during the corresponding location service interval;
   wherein the first wireless device is one of a single channel-only device that tunes from one of the first non-interfering wireless channels to the second shared channel during the corresponding location service interval, then returns to the one first non-interfering wireless channel after the corresponding location service interval, or the first wireless device is a multiple-channel device that concurrently operates on the one first non-interfering wireless channel and the second shared channel.

15. The apparatus of claim 10, wherein the processor circuit further is configured for:
   determining one or more interfering wireless regions and one or more non-interfering wireless regions in the WLAN;
   identifying, from among the wireless APs, first APs associated with the one or more interfering wireless regions and second APs associated with the one or more non-interfering wireless regions; and
   scheduling a first portion of the location service intervals as non-overlapping among a first portion of the wireless client devices in the interfering wireless regions, ensuring no other wireless device interferes with the corresponding wireless client device on the second shared channel during the corresponding location service interval.

16. The apparatus of claim 15, wherein the scheduling further comprises scheduling a second portion of the location service intervals as overlapping among a first of the wireless client devices in a first of the non-interfering wireless regions and a second of the wireless client devices in a second of the non-interfering wireless regions.

17. The apparatus of claim 10, wherein the bandwidth of the second shared channel enables determining the location of the at least one wireless client device to one meter or less within the WLAN.

18. One or more non-transitory tangible media encoded with logic for execution by a machine and when executed by the machine operable for:
   first causing, by the machine implemented as a controller device, wireless access points (APs) to allocate first non-interfering wireless channels for a prescribed reliable data service for wireless client devices in a wireless local area network (WLAN);
   second causing, by the controller device, the wireless APs to allocate a second shared channel having a bandwidth that is at least twice the corresponding bandwidth of any of the first non-interfering wireless channels;
   allocating for each wireless client device, by the controller device, a corresponding location service interval on the second shared channel for transmission of at least a corresponding identifiable wireless data unit for locating the corresponding wireless client device between two or more of the wireless APs; and
   determining, by the controller device, a location of at least one of the wireless client devices based on reception of at least the corresponding wireless data unit between the one wireless client device and the two or more wireless APs during the corresponding location service interval.

19. The one or more non-transitory tangible media of claim 18, wherein the allocating comprises:
   causing a first of the wireless APs to transmit, on a corresponding allocated first non-interfering wireless channel, an instruction that causes a first of the wireless client devices to execute exchange of at least the corresponding identifiable wireless data unit on the second shared channel during the corresponding location service interval;
   wherein the first wireless device is one of a single channel-only device that tunes from one of the first non-interfering wireless channels to the second shared channel during the corresponding location service interval, then return to the one first non-interfering wireless channel after the corresponding location service interval, or the first wireless device is a multiple-channel device that concurrently operates on the one first non-interfering wireless channel and the second shared channel.

20. The one or more non-transitory tangible media of claim 18, further operable for:
   determining, by the controller device, one or more interfering wireless regions and one or more non-interfering wireless regions in the WLAN;
   identifying, from among the wireless APs, first APs associated with the one or more interfering wireless regions and second APs associated with the one or more non-interfering wireless regions; and
   scheduling a first portion of the location service intervals as non-overlapping among a first portion of the wireless client devices in the interfering wireless regions, ensuring no other wireless device interferes with the corresponding wireless client device on the second shared channel during the corresponding location service interval.

* * * * *

UNITED STATES PATENT AND TRADEMARK OFFICE
CERTIFICATE OF CORRECTION

PATENT NO. : 11,516,808 B2
APPLICATION NO. : 17/154131
DATED : November 29, 2022
INVENTOR(S) : Matthew Aaron Silverman It is certified that error appears in the above-identified patent and that said Letters Patent is hereby corrected as shown below:

In the Specification

Column 3, Line 60, please amend as shown:
access point devices (APs) 12 (e.g., 12a through 12f) for Column 3, Line 62, please amend as shown:
(e.g., 14a through 14f), according to an example embodi- Column 5, Line 12, please amend as shown:
other wireless client device 14 (e.g., 14b through 14f)

Column 9, Line 1, please amend as shown:
"R6" 58f (generated by the wireless AP device 12f) does not Signed and Sealed this
Twenty-first Day of February, 2023

Katherine Kelly Vidal
*Director of the United States Patent and Trademark Office*